(12) United States Patent
Clark

(10) Patent No.: US 12,042,801 B2
(45) Date of Patent: Jul. 23, 2024

(54) RECYCLING WASTE REFRACTORY MATERIAL

(71) Applicant: Chester Arthur Clark, Hamilton, GA (US)

(72) Inventor: Chester Arthur Clark, Hamilton, GA (US)

(73) Assignee: Chester Arthur Clark, Hamilton, GA (US)

( * ) Notice: Subject to any disclaimer, the term of this patent is extended or adjusted under 35 U.S.C. 154(b) by 0 days.

(21) Appl. No.: 17/389,291

(22) Filed: Jul. 29, 2021

(65) Prior Publication Data

US 2022/0032314 A1    Feb. 3, 2022

Related U.S. Application Data

(60) Provisional application No. 63/058,027, filed on Jul. 29, 2020.

(51) Int. Cl.
| | |
|---|---|
| *B03B 9/00* | (2006.01) |
| *B02C 13/18* | (2006.01) |
| *B02C 23/08* | (2006.01) |
| *B03B 9/06* | (2006.01) |
| *C01F 7/023* | (2022.01) |
| *C04B 35/101* | (2006.01) |
| *C04B 35/622* | (2006.01) |

(52) U.S. Cl.
CPC ............ *B03B 9/00* (2013.01); *B02C 13/1807* (2013.01); *C01F 7/023* (2013.01)

(58) Field of Classification Search
CPC ........ B03B 9/04; B02C 13/1807; C01F 7/023
USPC ............................................................. 209/3
See application file for complete search history.

(56) References Cited

U.S. PATENT DOCUMENTS

| | | | | |
|---|---|---|---|---|
| 2,798,674 A | * | 7/1957 | Denning | B01D 37/02 252/378 R |
| 5,558,279 A | * | 9/1996 | Desrumaux | B03B 9/04 241/24.25 |
| 2011/0072935 A1 | * | 3/2011 | Gillis | B03C 1/14 75/10.67 |

FOREIGN PATENT DOCUMENTS

| | | | | |
|---|---|---|---|---|
| EP | 0243123 A1 | * | 4/1987 | ............. C04B 35/10 |
| EP | 0568941 B1 | * | 4/1993 | ............. B02C 13/14 |

\* cited by examiner

*Primary Examiner* — Michael McCullough
*Assistant Examiner* — Molly K Devine
(74) *Attorney, Agent, or Firm* — Perilla Knox & Hildebrandt LLP; James J. Rha

(57) ABSTRACT

Disclosed are systems and methods for refractory recycling that result in refined individual refractory components from a network of aggregate refractory components based on a fragmentation process. In one embodiment, a network of refractory aggregates is crushed and deposited into a refiner machine. The refiner machine includes a blast chamber that houses a projecting mechanism. The deposited aggregate material is propelled from the projecting mechanism at a critical velocity. Upon impact with an inner lining of material within the blast chamber, contaminant particles can fracture apart from the deposited aggregate material, leaving a refined individual refractory component.

20 Claims, 16 Drawing Sheets

FIG. 18

RENO REFRACTORIES, INC.

Raw Material Testing and Evaluation
Supplier: American Metallurgical Services
Material: Reno-RC98 LC (Orange)
Date: 5/14/2021

Chemical Composition (ASTM E1508-2019)

| | +35 | -100 | DC |
|---|---|---|---|
| Al2O3 | 97.26 | 94.18 | 91.68 |
| CaO | 0.81 | 2.71 | 4.45 |
| SiO2 | 0.89 | 1.92 | 2.53 |
| Na2O | 0.47 | 0.85 | 0.57 |
| MgO | | 0.29 | 0.43 |
| P2O5 | | 0.05 | 0.35 |
| FeO | 0.57 | | |

FIG. 19

RENO REFRACTORIES, INC.

Raw Material Testing and Evaluation
Supplier: American Metallurgical Services
Material: Reno-RC98 LC (Yellow)
Date: 5/14/2021

Chemical Composition (ASTM E1508-2019)

| | +40 | -40 | DC |
|---|---|---|---|
| Al2O3 | 96.88 | 80.15 | 80.81 |
| SiO2 | 0.78 | 5.58 | 12.94 |
| CaO | 0.31 | 1.79 | 2.76 |
| FeO | | 0.18 | 1.25 |
| Na2O | 1.04 | 1.08 | 1.15 |
| MgO | 0.67 | 0.70 | 0.63 |
| P2O5 | | 0.55 | 0.33 |
| Cr2O3 | | | 0.24 |
| TiO2 | 0.31 | | |
| Cr2O3 | 0.31 | | |

RECYCLING WASTE REFRACTORY MATERIAL

CROSS-REFERENCE TO RELATED APPLICATIONS

This application claims priority to, and the benefit of, U.S. Provisional Patent Application No. 63/058,027, entitled "RECYCLING WASTE REFRACTORY MATERIAL," filed on Jul. 29, 2020, which is incorporated herein by reference in its entirety.

BACKGROUND

Refractory materials are used as a lining material for ovens, processing equipment, melting furnaces, investment casting molds, 3D printing of refractory shapes, and other high temperature processes. Currently, about 40 million tons of refractory products are used each year, and 28 million tons of refractory waste are generated. About 7% of refractory waste material is currently recycled. Because most recycled refractory materials remain contaminated with binder materials and low-grade components, most are only suitable for use in low value applications such as roadbed foundations or slag conditioners. Furthermore, refractory waste is largely inert. Therefore, landfilling has been industry's lowest cost disposal option.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 18 and 19 show test results conducted for reno brick material that was processed in the refining machine shown in FIG. 6 according to one embodiment of the present disclosure.

DETAILED DESCRIPTION

Figure 1:
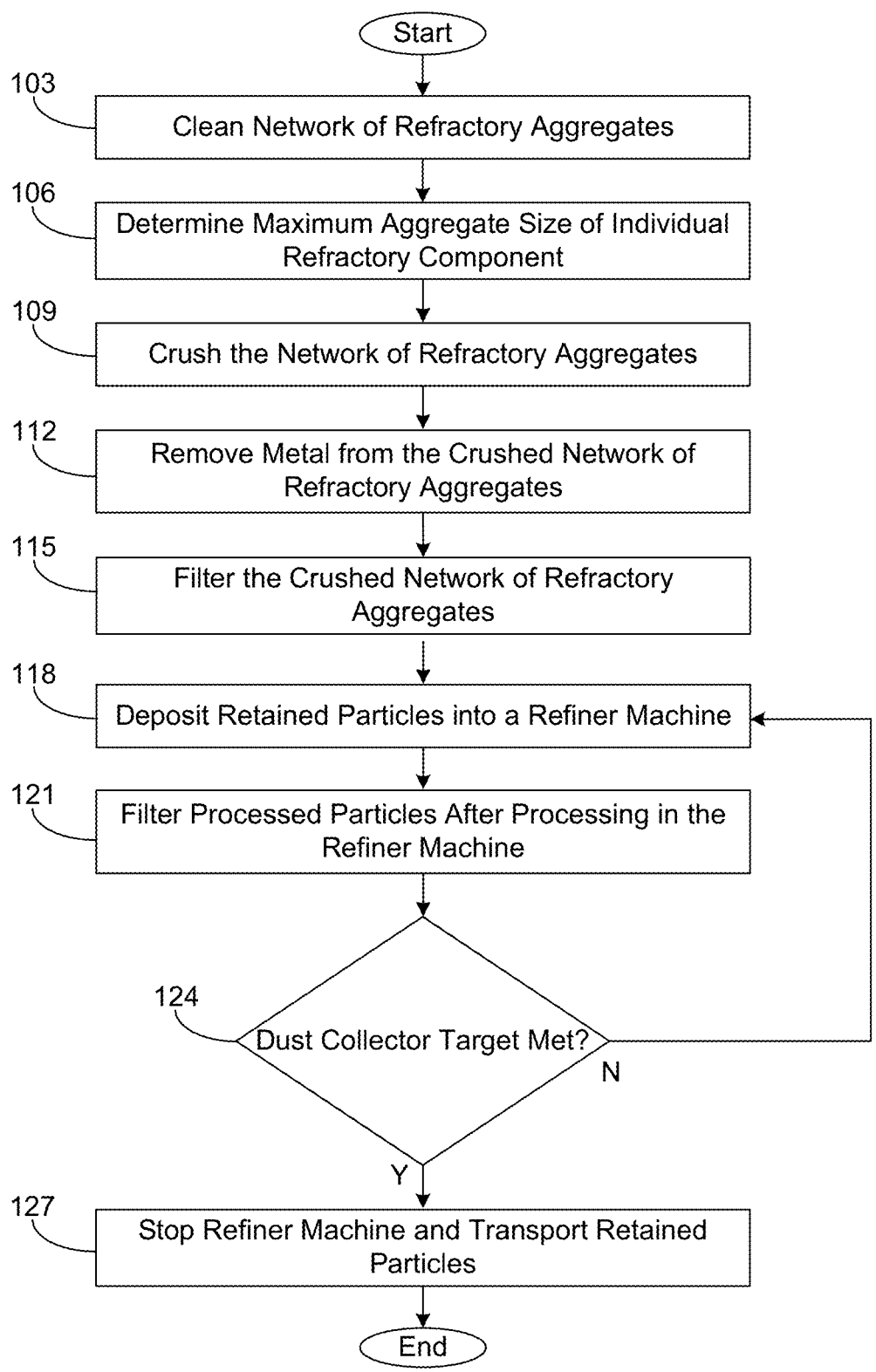
FIG. 1 is a flowchart illustrating an example refractory recycling method according to one embodiment of the present disclosure.

Refractory materials are vital to industry and national security. Examples of industries depending on large quantities of refractories include steel, iron, aluminum, cement, glass, and ceramics. The chemistry of the refractory for a specific application is dependent upon the environment in which it is used. Three composition classes of refractories can include acid, neutral, and basic. Furthermore, there are several refractory installation methods. Each installation requires a specific recipe of refractory aggregates, typically a cement or resin binder, and water. In a brick installation, refractories are mixed, pressed into a shape, and fired prior to installation. In a monolithic installation, the refractory recipe is mixed off site and remains in powder form until installation by mixing with water or other chemicals on site and then applied by ramming, gunning, pouring, vibrating, etc.

Due to the rising cost of raw materials, supply concerns, political concerns, environmental considerations, and the increasing costs for landfilling, refractory recycling is desirable. Existing refractory recycling efforts have targeted the "basic" $M_gO$ refractories and have been unsuccessful at producing a consistent quality product that can be used as an alternative high value raw material in new refractory production. Existing processes for recycling of refractories can include sorting the materials, crushing, and screening. The reasons for failure can include:

Inconsistent Supply: Spent refractories are being procured from many different companies in small batch quantities.

Sorting of Raw Material: The different classes of refractories cannot be mixed. Often, consumers "zone" their furnaces with different classes of refractories. Several methods of sorting have been investigated but they can be either too expensive, or unreliable.

Contamination: Lime, soda, pot ash, and other materials used in metals production are detrimental to the recycling effort. Likewise, the binders used in making the original refractories and mixed refractory classes within a certain refractory class, contaminates the raw material of the recycling process.

To summarize, the fundamental failure of previous attempts to produce a high value recycled refractory material can be seen as the inability to remove contamination. Therefore, the resulting product is only useful in low value applications. A simple sorting, crushing, and screening process crushes the larger, pure aggregate as well. The resulting aggregate particles still have cement and other unwanted contaminants adhered to them rendering them unsuitable for use in new, high value, refractory production. For refractory recycling to be successful, a new recycling method is required. Various embodiments of the present disclosure allow for the recycling and refining of spent (used) refractory materials, reduce landfill costs, reduce energy consumption, and can produce products which can be used as a high value replacement of the virgin raw material currently used in the production of new refractory materials. In the following discussion, a general description of the system and its components is provided, followed by a discussion of the operation of the same.

With reference to FIG. 1, shown is a flowchart that provides an example refractory recycling method according to an embodiment of the present disclosure. Starting with step 103, a network of refractory aggregates is obtained and cleaned. A network of refractory aggregates can correspond to any aggregate that can potentially be used in the formulation of a monolithic refractory. They are chosen based on their stability at the temperature of application, mechanical strength, and corrosion resistance. Examples of refractory aggregates can include bauxite, calcined and sintered alumina, fused alumina, fused bubble alumina, spinel, magnesia, dolomite, silicon carbide, chamotte, and vermiculite. Table 1 below shows raw materials used in the production of refractories, the % used, and the country of origin.

TABLE 1

| RAW MATERIAL | ESTIMATED % USED | ESTIMATED TONS | PRIMARY SOURCE |
| --- | --- | --- | --- |
| Refractory clays ($Al_2O_3$ + $SiO_2$) | 46% | 18,400,000 | China |
| Magnesia ($M_go$) | 26% | 10,400,000 | China |
| Recycled refractories | 7% | 2,800,000 | |
| Calcined bauxite ($Al_2O_3$) | 4% | 1,600,000 | China |
| Brown fused alumina ($Al_2O_3$) | 3% | 1,200,000 | China |
| Doloma | 3% | 1,200,000 | USA |
| Tabular alumina ($Al_2O_3$) | 2% | 800,000 | China |
| Calcined alumina ($Al_2O_3$) | 2% | 800,000 | China |
| Graphite (C) | 1% | 400,000 | China |
| Calcium aluminate cement | 1% | 400,000 | |
| Sillimanite minerals | 1% | 400,000 | South Africa |
| Chromite | 1% | 400,000 | South Africa |
| White fused alumina ($Al_2O_3$) | 1% | 400,000 | China |
| Zircon | 1% | 400,000 | Australia |
| Silicon carbide ($S_iC$) | 0.25% | 100,000 | China |
| Silica ($S_iO_2$) | 0.25% | 100,000 | USA |
| Spinel | 0.25% | 100,000 | China |
| Olivine | 0.25% | 100,000 | Norway |

Figure 2:
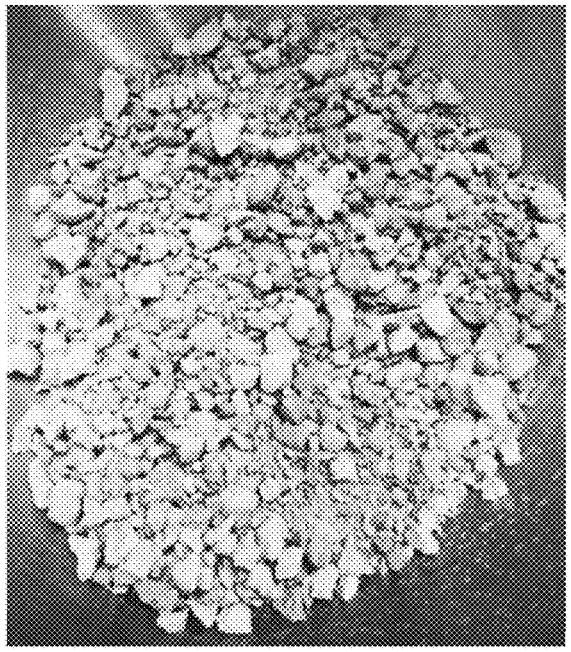
FIGS. 2-4 are examples of crushed refractory aggregate material according to one embodiment of the present disclosure.
Figure 3:
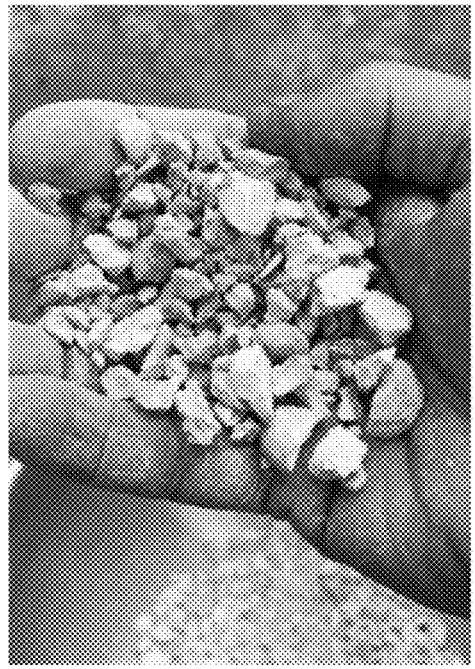
Figure 4:
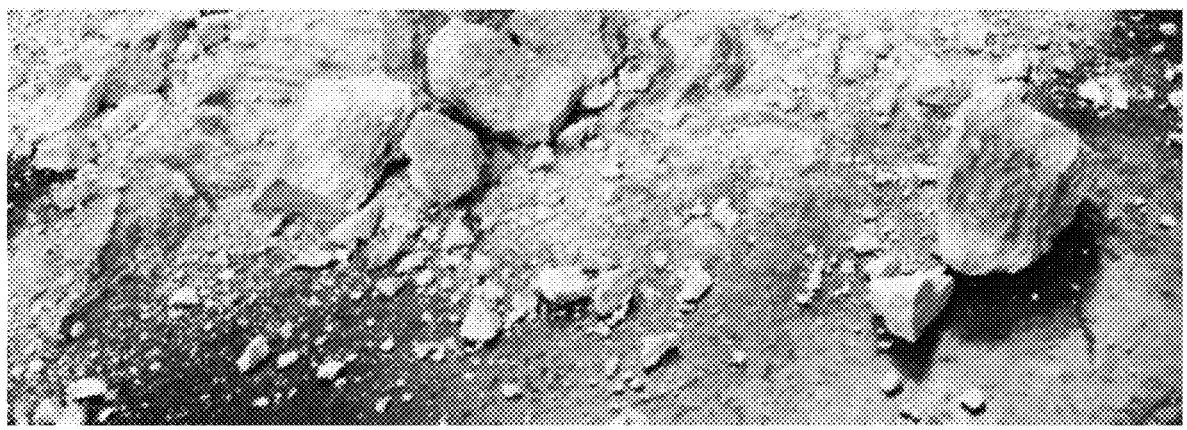

The initial cleaning process may involve subjecting the aggregate material through a quick preparation process to remove residual dirt or debris. For example, the aggregate material may include refractory brick, which is usually composed of clays that include alumina and silica. The refractory brick may be cleaned with hot water, a degreaser, pressure washing, or even placed in a rotary device that uses the aggregate material to clean itself while tumbling. FIGS. 2-4 show examples of refractory brick that has been crushed and cleaned.

At step 106, a maximum aggregate size of an individual refractory component of the network of refractory aggregates is determined. The maximum aggregate size may be determined based on the properties of the raw material to be refined, such as hardness, density, etc. For example, the composition of refractory brick can include 80% alumina, silica ($SiO_2$) aggregates, mullites, and magnesia ($M_go$) aggregates, and an object may be to extract alumina without the other compounds. Since alumina has the highest concentration and density in the compound, the maximum aggregate size should be of sufficient size so that individual particles, after a crushing and screening process, can withstand impact at high velocities. If the maximum aggregate size is too small, the desired refractory component may fracture as well when subjected to impact at high velocities. In some embodiments that use an automatic crusher, the maximum aggregate size to crush raw material may be manually set in the crushing machine.

The individual refractory component may correspond to the material to be recycled from the aggregate materials. For example, the material that is desired to be recycled from the refractory brick may be alumina ($Al_2O_3$). Therefore, an object according to one example embodiment of the flowchart shown in FIG. 1 may be to recycle and reuse just the alumina ($Al_2O_3$) aggregate in the refractory brick, separately from the "contaminants" that are a part of the refractory brick, such as the silica ($SiO_2$) aggregate, mullite clays, and cement. In this example embodiment, it may be determined that the maximum aggregate size of the alumina ($Al_2O_3$) aggregate to be extracted is $\frac{3}{8}$ $inch^2$. The maximum aggregate size may correspond to a size that will minimize the loss of individual aggregate particles being fractured during the crushing process and/or refining process.

At step 109, the network of refractory aggregates is subjected to a crushing process. The crushing process may be manual or automatic. For example, automatic crushers may include gyratory crushers, jaw crushers, cone crushers, and impact crushers. Examples of automatic crushers that may be used include Screen Machine's 5256T Rock Crusher, 4043T Rock Crusher, 4043TR Recirculating Rock Crusher, JXT Jaw Rock Crusher, Superior™ primary gyratory crushers, Nordberg® C Series™ jaw crushers, and other crushers. Manual crushers may involve hand operated crushers such as a stone crusher that can be hand spun. According to the example embodiment, it may be beneficial that the crushed particles of the network of refractory aggregates be sized slightly larger than the maximum aggregate size that was determined in step 106. Crushing to a size slightly larger than the maximum aggregate size can minimize loss of individual aggregate particles being fractured during the crushing and/or refining process. FIGS. 2-4 show examples of crushed refractory brick.

At step 112, any metal fragments or pieces may be removed from the network of refractory aggregates by exposing the aggregate material to a magnet. For example, a magnetic separator may be used to remove iron impurities from the refractory aggregate material. A magnetic field gradient may be applied to the refractory aggregates causing the iron impurities to move in the direction of the applied magnetic field. Examples of magnetic separators that may be used include cross belt magnets and pulley magnets. Cross belt separation magnets may include magnets such as the SEMO241 and SEMO722, which may generate a range of 1652-14500 watts. In addition, metal detectors may be used in conjunction with the magnetic separators to detect and remove tramp metal such as Bunting's TN77 series conveyor belt metal detector. Implementation of metallic detectors and magnetic separators may be beneficial in preventing damage to crushers, screens, and conveyors.

At step 115, the crushed network of refractory aggregates may be filtered by one or more screens to obtain consistently sized particles to deposit into a refiner machine. In an example embodiment, the screen used may be a RO-TAP® sieve shaker, Powerscreen® Chieftain 400, Powerscreen® Chieftain 600, Powerscreen® Chieftain 2100X, and other screens. Screen types may include freely vibrating screens, circular motion screens, linear motion screens, elliptic motion screens, brute force screens, resonance screens, sizers, banana screens, special screens, and other screen types. A screen may have a mesh size, such as a U.S. Mesh Size, that is defined as the number of openings in one square inch of a screen. According to one embodiment of the present disclosure, the mesh size may be equal to or slightly greater than the maximum aggregate size determined in step 106. That is, if the maximum aggregate size determined is $\frac{3}{8}$ inch$^2$, each opening of the screen may be $\frac{3}{8}$ inch$^2$.

Figure 5:
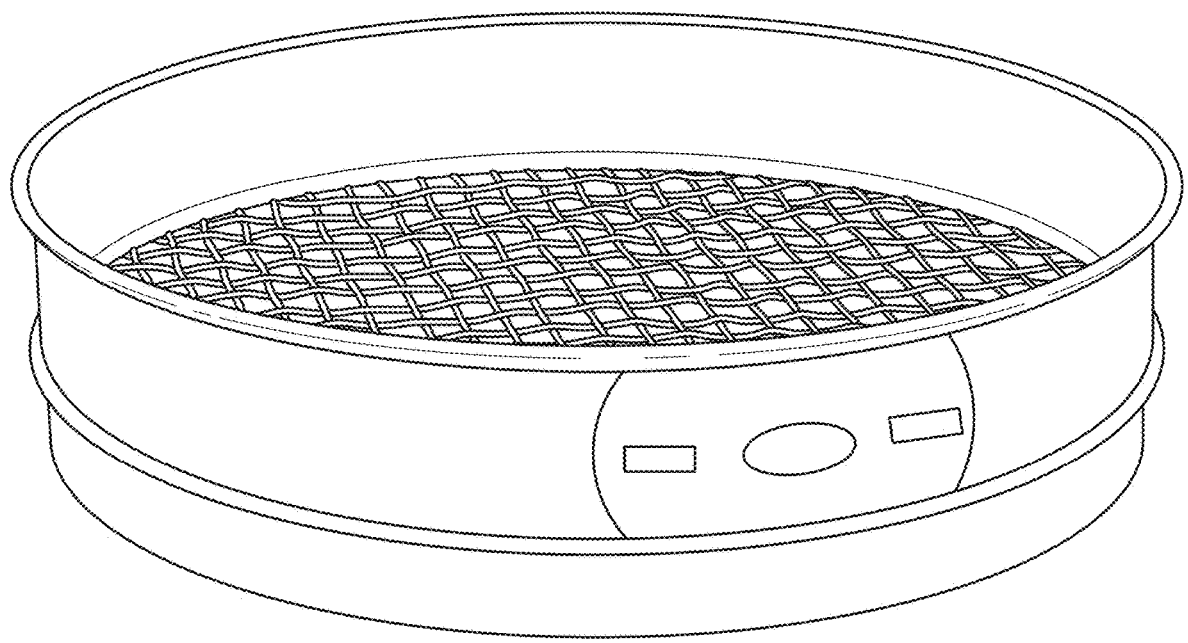
FIG. 5 shows an example screen that can be used to filter raw aggregate material according to one embodiment of the present disclosure.

In another embodiment, the mesh size may be smaller than the maximum aggregate size determined. Ultimately, the mesh size may be selected based on individual preference and/or the maximum aggregate size of the individual refractory component to be extracted from the network of refractory aggregates. Selecting such mesh sizing can allow consistently sized particles of crushed aggregate refractory material to be obtained. Once the crushed network of refractory aggregates is filtered through the screen, particles of a sufficient size are retained on the screen, while smaller particles may fall through the screen. FIG. 5 illustrates an example screen that may be used in the various embodiments disclosed herein. In some embodiments, differently sized screens may be used at different parts of the refining process based on desired material size, screening capacity, feeding capacity, and separation size.

Figure 6:
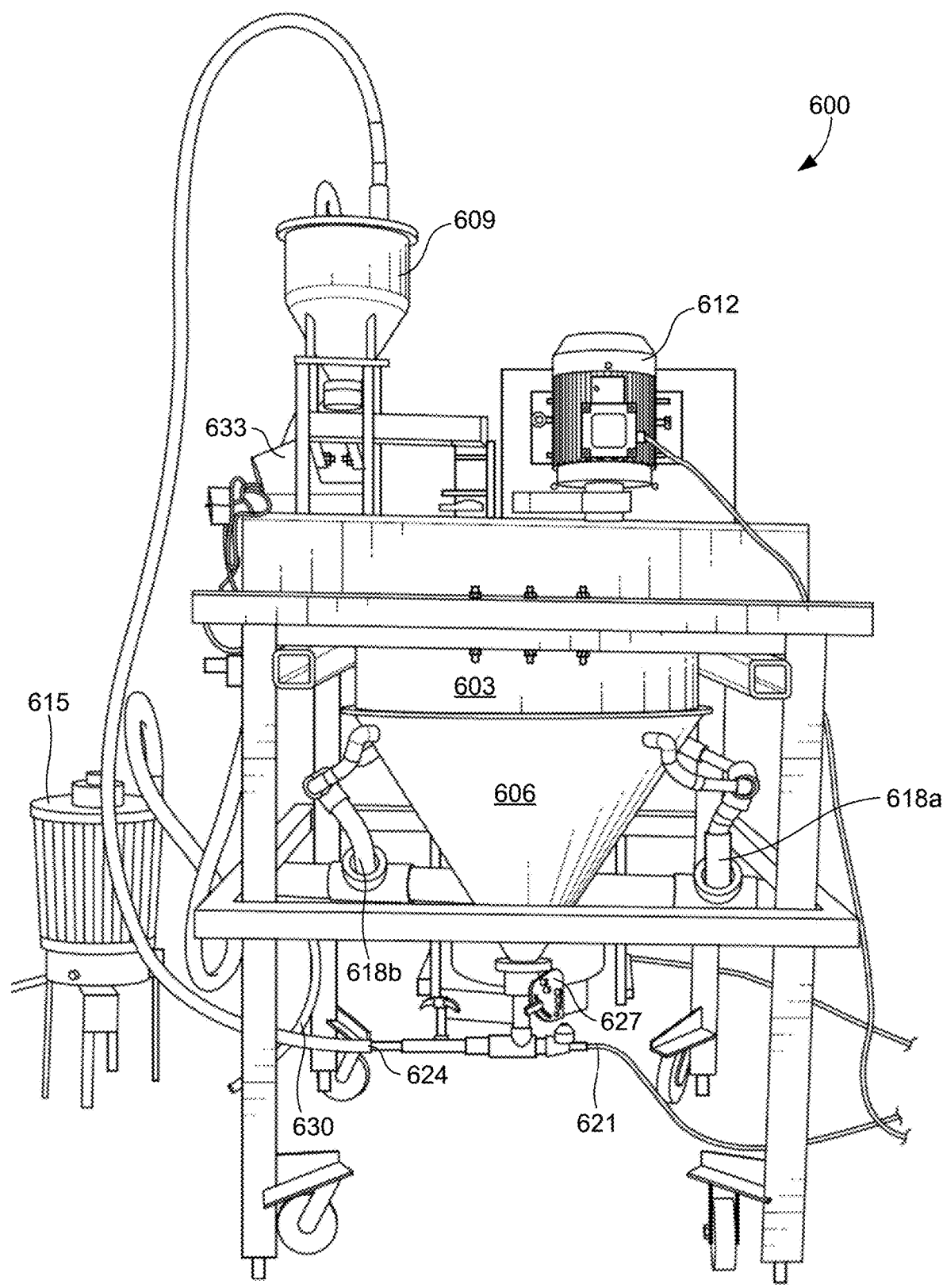
FIG. 6 shows an example refining machine used to refine raw aggregate material according to one embodiment of the present disclosure.

At step 118, the retained particles discussed in step 115 may be deposited into a refiner machine 600 for the refining and fragmentation process. According to one embodiment of the present disclosure, the refiner machine 600, as shown in FIG. 6, can include a blast chamber 603, a compartment 606, a feed hopper 609, a motor 612, a harvest hopper 615, dust collection valves 618a and 618b, air compression valve 621, a feed valve 624, a butterfly valve 627, a harvest valve 630, and a magnetic feeder 633. The valves 618a, 618b, 621, 624, 627, and 630 may work in conjunction with one another based on a pressurized air system model to move air, dust particles, and refined particles to various components of the refiner machine 600 as can be appreciated.

To deposit the retained particles as discussed in step 118, the retained particles may first be deposited through the feed hopper 609. The feed hopper 609 is connected to the magnetic feeder 633, which can control flow of the retained particles into the blast chamber 603. In an example embodiment, the magnetic feeder 633 can include a Syntron® magnetic feeder with a control unit. The magnetic feeder 633 can include a vibrating feeder that can vary the flow of material through the feeder by adjusting the amplitude of the feeder pan. In one embodiment, the magnetic feeder 633 can be configured to process 4-15 tons of material per hour. In other embodiments, the magnetic feeder 633 may have a feed rate of up to 30 tons of material per hour depending on the size of the feed hopper 609.

In one embodiment, the feed hopper 609 may be designed to support a mass flow or a funnel flow of material. In mass flow, an entire bed of solids is in motion when material is discharged from the outlet, which eliminates the formation of stagnant regions in the vessel, and affords a "first-in, first-out" flow sequence, which provides a more uniform velocity profile during operation. A uniform velocity profile may also help to reduce the effects of sifting segregation. By contrast, in funnel flow, an active flow channel forms above the outlet, but stagnant material remains (called ratholes) at the periphery of the vessel. Funnel flow can cause erratic flow, exacerbate segregation, reduce the live capacity of a vessel, and allow particle degradation in stagnant region. In one embodiment, the feed hopper 609 includes a cylindrical shape that tapers down to a cone like shape toward the exit of the feed hopper 609.

Figure 7:
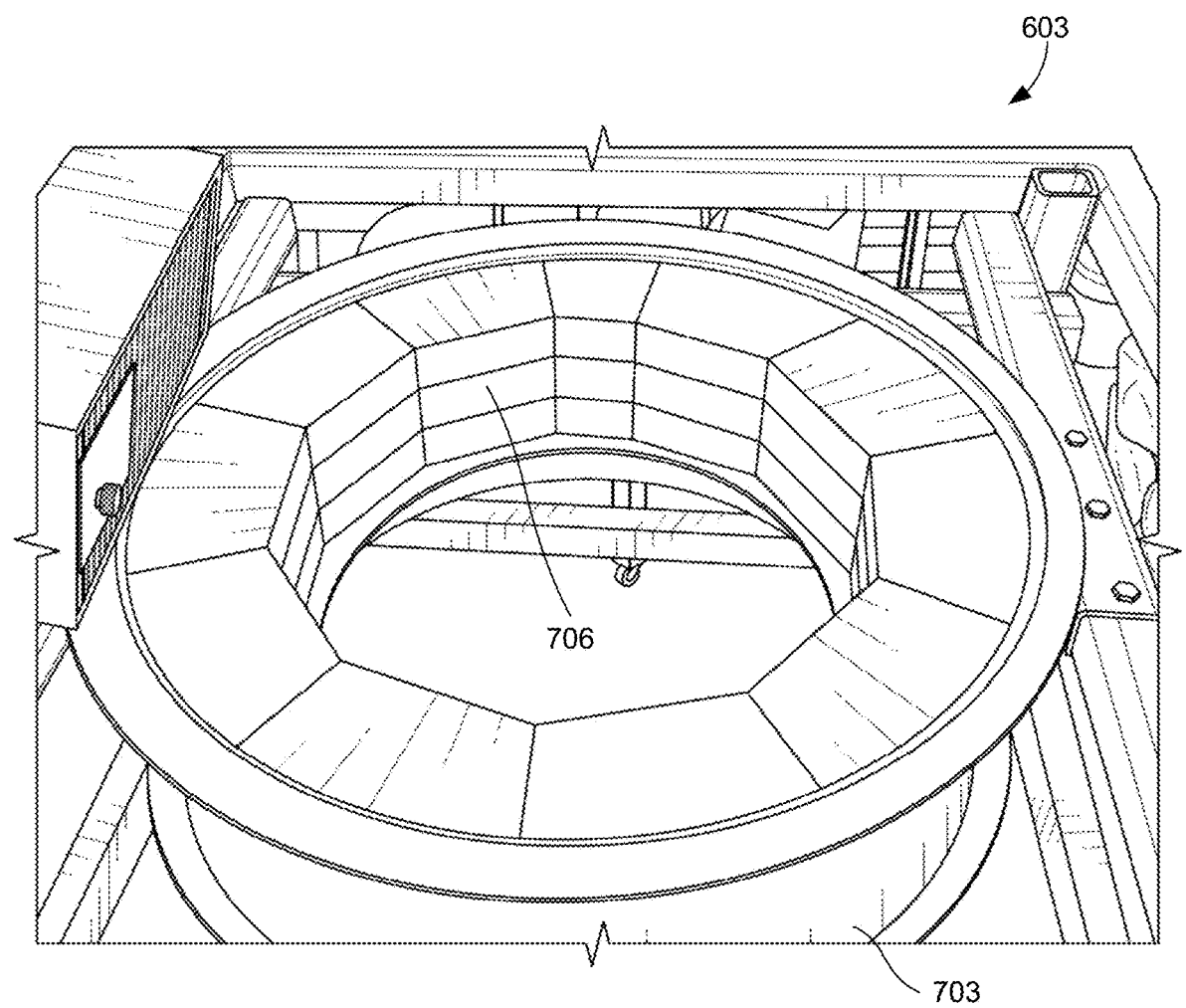
FIG. 7 shows an example blast chamber as a component of the refining machine shown in FIG. 6 according to one embodiment of the present disclosure.

Once passed through the magnetic feeder 633, the retained particles from the first screening process can be deposited into the blast chamber 603. The retained particles (aggregate raw material) may be passed into the blast chamber 603 through a funnel that is connected to the magnetic feeder 633. FIG. 7 shows a view of the blast chamber 603 according to an example embodiment of the present disclosure. The blast chamber 603 can include an outer wall 703 and an inner lining of material 706. In an example embodiment, the blast chamber 603 may be of a circular and/or cylindrical shape with the outer wall 703 extending around the circumference of the blast chamber 603. The blast chamber 603 may be constructed of a metal material such as steel or iron.

The inner lining of material 706 surrounds the inner circumference of the outer wall 703. As an example embodiment, FIG. 7 illustrates circular rows and columns of refractory brick that have been stacked on top of one another. In other embodiments, the inner lining of material 706 may be constructed of iron or other metals. An object of the inner lining of material 706 is to function as a contact point or fragmentation point of raw aggregate material that is flung or propelled against the material 706. Accordingly, the inner lining of material 706 should be of sufficient hardness so as to fracture raw aggregate material that is propelled against the material 706 at high velocity.

Figure 8:
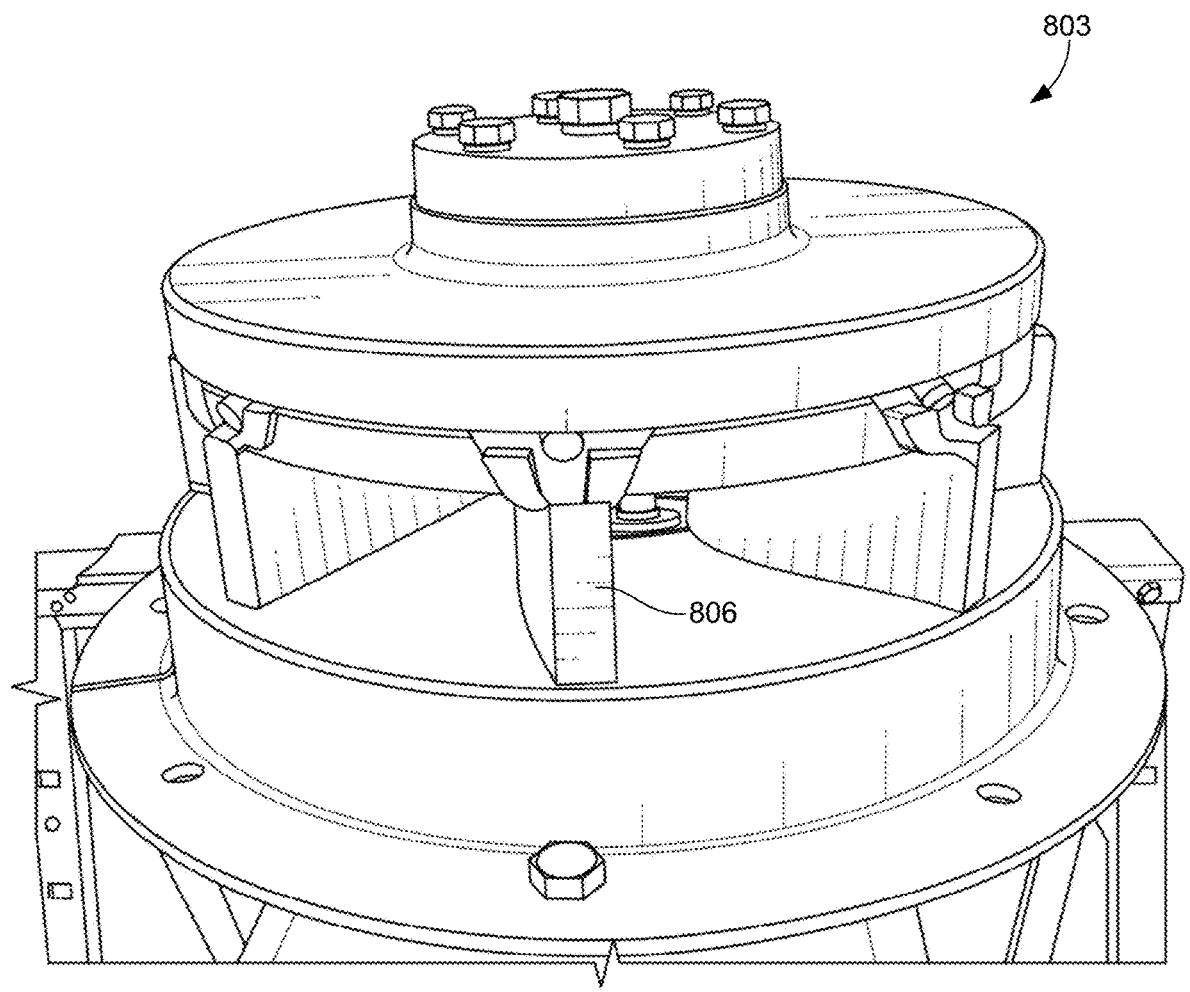
FIG. 8 shows an example projecting mechanism positioned in the blast chamber shown in FIG. 7 according to one embodiment of the present disclosure.

FIG. 8 shows a side view of a projecting mechanism 803 that is positioned within the blast chamber 603. As an example embodiment, the projecting mechanism 803 may include a wheel 803 that is configured to spin either at a fixed revolutions per minute (RPM) or a variable (RPM) based on the motor 612. For example, the motor 612 may include a 3 phase, 10 horsepower (hp) motor that can be configured to operate at 3,600 RPM. The motor 612 may be coupled to the projecting mechanism 803 in the blast chamber 603 through a drive shaft. The wheel 803 may further include one or more blades 806 that is dry fit to the wheel 803. The one or more blades 806 may be secured to the wheel by one or more pins. When the aggregate raw material is deposited onto the wheel 803, the one or more blades 806 may operate to sling the aggregate raw material to the inner lining 706. As the wheel 803 and the blades 806 spin at high velocity, a centrifugal force is generated that creates positive air pressure below the wheel 803 and into the compartment 606 and negative air pressure above the wheel 803. Accordingly, the wheel 803 operates as a pump to transfer air and particle material from above the wheel 803 to below the wheel 803 as the wheel 803 spins at a set RPM.

Figure 9:
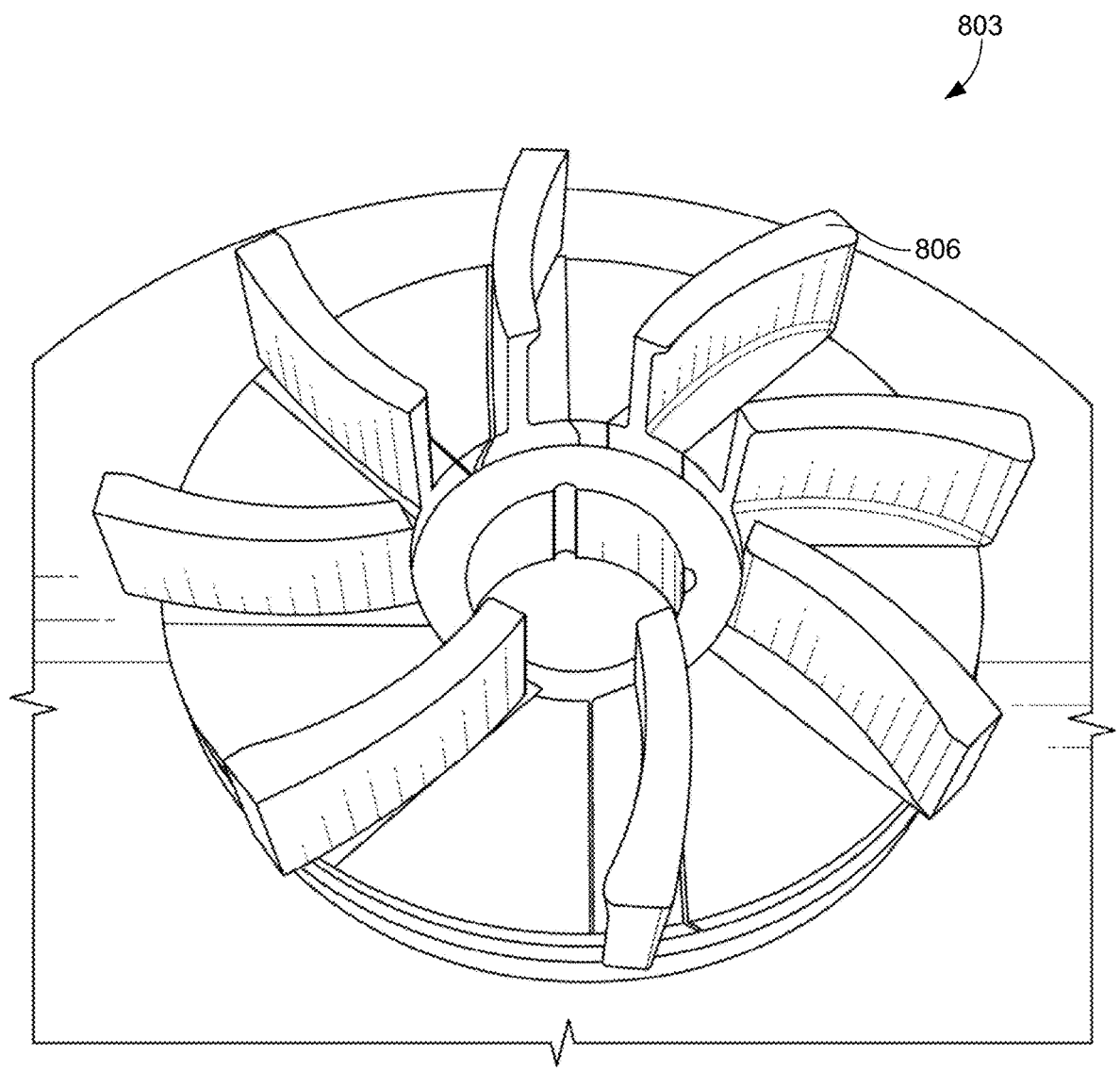
FIG. 9 shows a second view of the example projecting mechanism shown in FIG. 8 according to one embodiment of the present disclosure.

Shown in FIG. 9 is another view of the wheel 803. In this example embodiment, there are a total of eight blades 806, with each of the blades 806 having curved or slanted sides to radially guide particles from the center of the wheel 803 to the circumference of the wheel 803 as the particles are deposited onto the wheel 803. The centrifugal force generated by the wheel 803 and the blades 806 spinning at a set RPM allows the wheel 803 to transfer a consistent velocity the aggregate particles that are deposited onto the wheel 803. To control the RPM of the motor 612, a variable frequency drive (VFD) unit may be used.

When determining the velocity and the RPM to be applied to the wheel 803, specific properties of individual refractory components within a network of refractory aggregates should be considered to separate the refractory network into purified aggregates. For example, the specific properties that should be considered can include density, compressive strength, fracture toughness, and hardness. Applying impact dynamics derived from Newton's $2^{nd}$ and $3^{rd}$ law of motion, the mechanism for separating the refractory network into purified aggregates are described below:

Newton's $2^{nd}$ law: Force=mass*acceleration

Newton's 3rd law: For every action, there is an equal and opposite reaction

Applying impact dynamics, the kinetic energy just prior to impact=work done after impact:

$$KE = 0.5 \, mv^2 \quad (1)$$

$$W = Fd \quad (2)$$

Approximation of the forces experienced on impact are expressed:

$$F_{avg} = \frac{0.5mv^2}{d}, \quad (3)$$

where $F_{avg}$ is the average force experienced over a deformation distance d, in an impact scenario, and $$F_{avg} = \frac{mv}{t} \quad (4)$$

is also the average force experienced over a deformation time t, in an impact scenario. Therefore, it can be said that:

$$F_{max} = 2F_{avg} \quad (4)$$

where $F_{max}$ is equal to the maximum impact force over a deformation distance d, or over a deformation time t.

In addition, refractory materials are some of the hardest materials known, and while they are tough, they have little elasticity. Therefore, in an example embodiment of the present disclosure, the distance d or the time t in the above equations may be miniscule in an impact scenario. Accordingly, a piece of refractory material propelled into a stationary object, impacting at a force which exceeds the crushing strength of the material, can fracture the material. Using the mechanical properties of the individual materials, the "critical" velocity (fracture velocity) required to fracture each individual material within the refractory matrix, for a given particle size, can be estimated. However, other influences like friction, air resistance, and particle shape can impact the estimation of the critical velocity. Considering a system of millions of particles, and the fact that each material has its own hardness, the particles will be cleaned during the rebound action and the scrubbing action, both of which occur below the fracture velocity.

Figure 10:
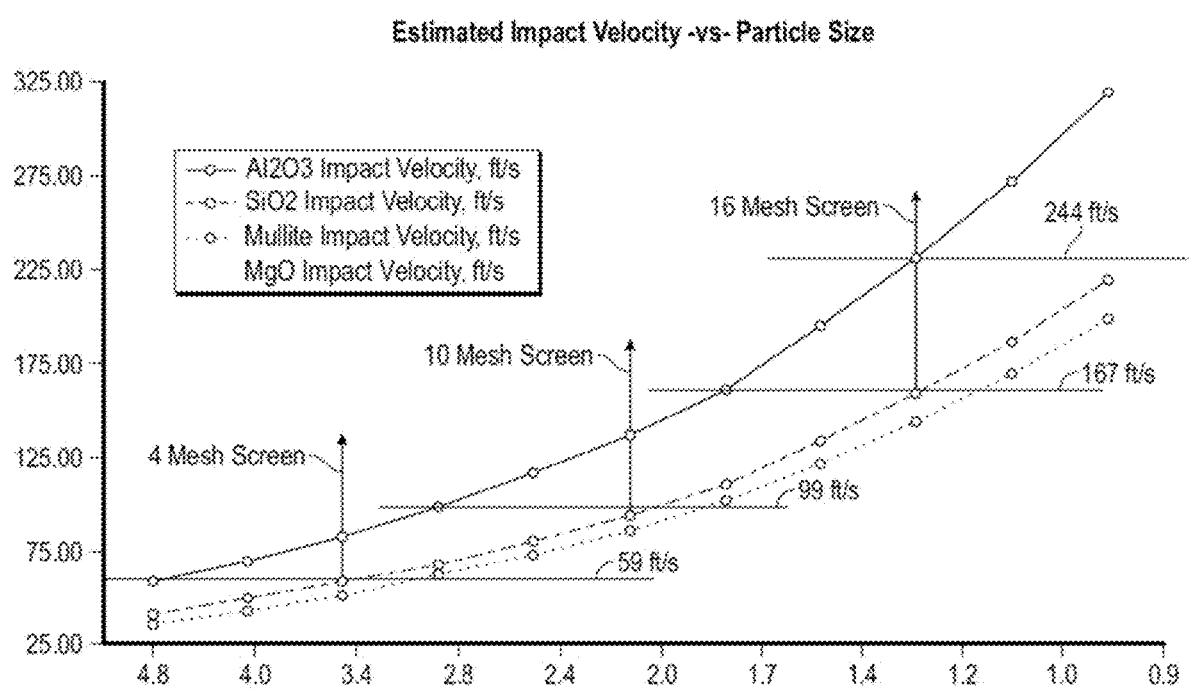
FIG. 10 shows a graph illustrating estimated impact velocities versus particle sizes for different refractory components according to various embodiments of the present disclosure.
Figure 11:
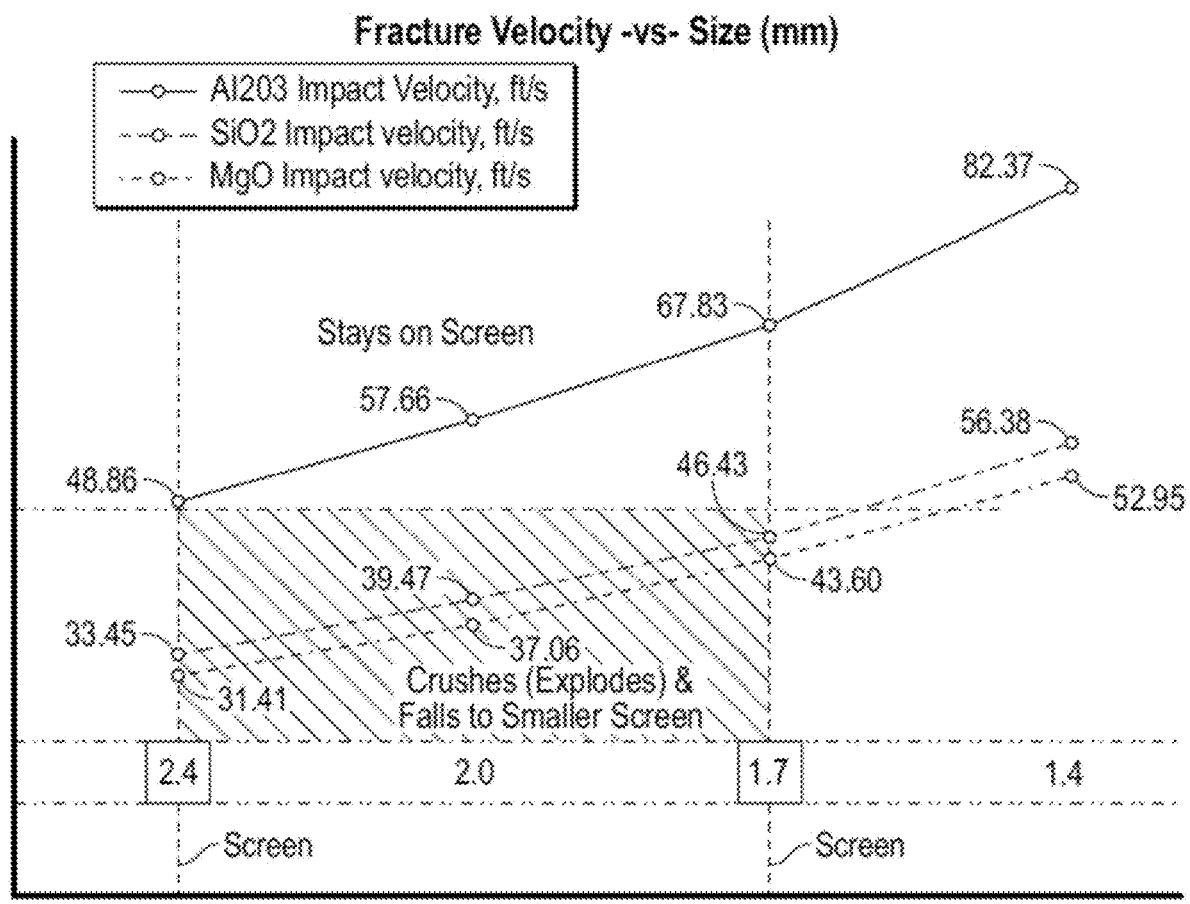
FIG. 11 shows a graph illustrating estimated fracture velocities versus particle size for different refractory components according to various embodiments of the present disclosure.

With reference to FIG. 10, shown is a graph that illustrates estimated impact velocity vs. particle size for alumina ($Al_2O_3$), magnesia ($M_gO$), silica ($SiO_2$), and mullite. With reference to FIG. 11, shown is a graph that illustrates fracture velocity vs size of the raw material for alumina ($Al_2O_3$), magnesia ($M_gO$), and silica ($SiO_2$). As can be seen in FIG. 11, alumina ($Al_2O_3$) has a higher fracture velocity than magnesia ($M_gO$) and silica ($SiO_2$).

According to various embodiment of the present disclosure, refractory brick, castable, or dry vibrateable refractory products include a matrix of smaller aggregate particles and cement filling the voids between larger aggregate particles. The present embodiments are based upon the concept of returning a spent refractory material, as close as possible, to their original aggregate state.

For example, consider an 80% alumina refractory brick. Each material within the refractory brick has its own unique physical and mechanical properties. Considering the refractory mix within the brick, the $Al_2O_3$ aggregate, typically has the largest aggregate, has the highest density, the highest crushing strength, the highest fracture toughness, and the highest hardness of any of the materials within the brick. The other components are typically $SiO_2$ aggregate, mullite clays, and cement. These have lower mechanical properties and are usually smaller sized aggregates.

Accordingly, the velocity required in propelling a particle against a stationary object, to cause fracturing or explosion of the particle, can be calculated based at least in part on the physical and mechanical properties of individual particles. Since $Al_2O_3$ aggregate has a higher density (weight/volume), a higher compression strength, and a higher fracture toughness than those of magnesia ($M_gO$) aggregates, silica ($SiO_2$) aggregates, etc., equally sized particles of $Al_2O_3$, $SiO_2$, mullite, etc., propelled at a velocity slightly under the "fracture velocity" of the $Al_2O_3$, can fracture everything but the $Al_2O_3$ aggregate. In addition, $Al_2O_3$ has a higher hardness than those of magnesia ($M_gO$) aggregates, silica ($SiO_2$) aggregates, mullites, etc. Therefore, the abrasive action created during the process will aid the cleaning of the $Al_2O_3$ aggregate. Coupled to a screening system, and velocity control system, the $Al_2O_3$ particles of different sizes can be refined and extracted.

Figure 12:
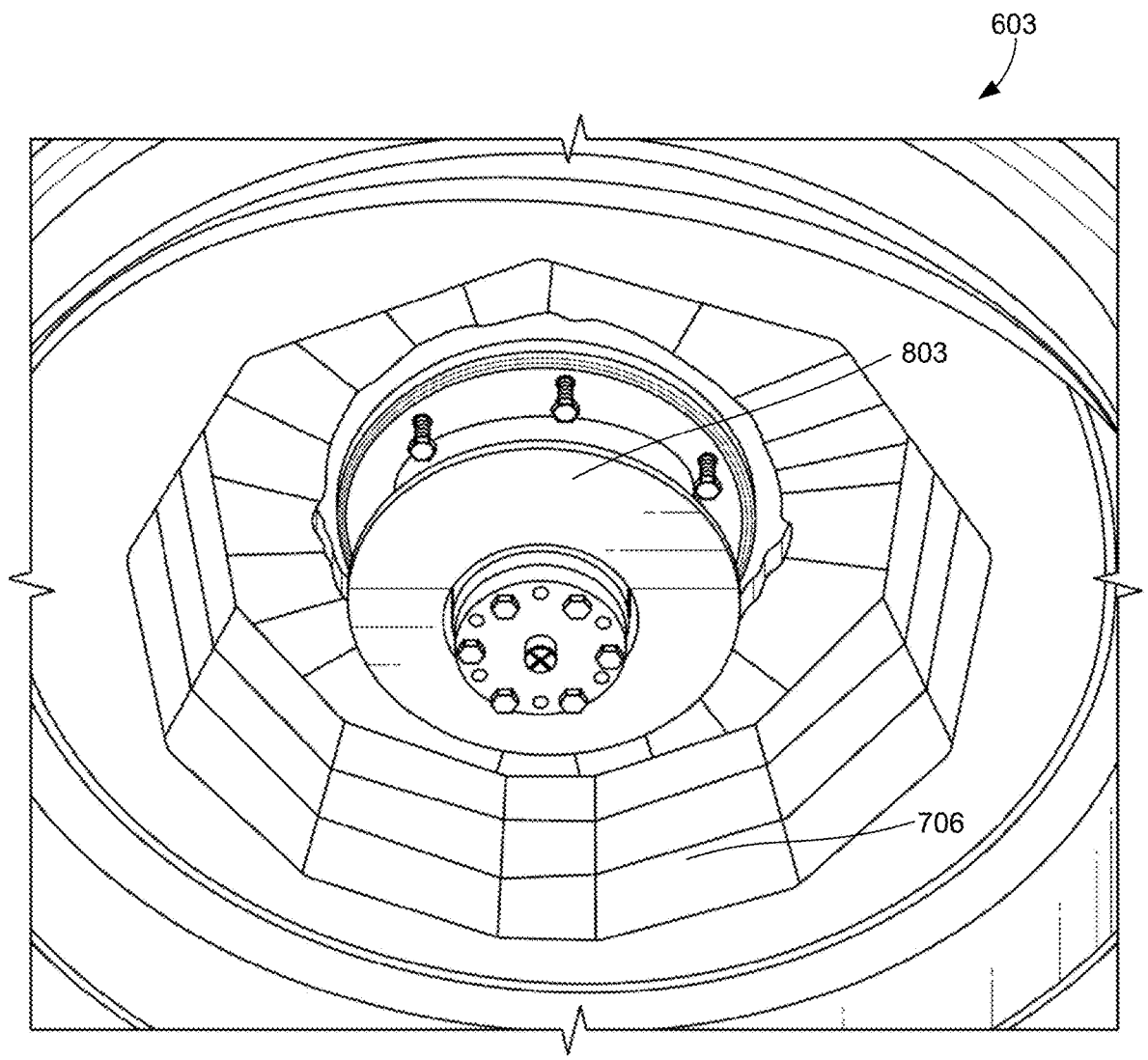
FIG. 12 shows a low angle view of the blast chamber that incorporates the projecting mechanism shown in FIG. 8 according to one embodiment of the present disclosure.

Referring to FIG. 12, shown is a low angle view of the blast chamber 603 with the compartment 606 disassembled from the refiner machine 600. As discussed above with respect to FIGS. 7-9, the wheel 803 can spin at a set RPM based on the RPM of the motor 612. As refractory aggregate material is deposited onto the wheel 803, the blades 806 act to propel the deposited refractory aggregate material at the inner lining of material 706. According to an example embodiment, refractory brick that has been cleaned, crushed, and screened at a maximum size corresponding to a desired maximum size of the alumina ($Al_2O_3$) aggregate can be deposited onto the wheel 803. The wheel 803 is operated at 3500 RPM with the motor running at 1750 RPM. This velocity from the resultant centrifugal force of the wheel 803 propels the crushed refractory brick aggregate to the inner lining 706, resulting in contaminant particles such as the magnesia ($M_gO$) aggregates and silica ($SiO_2$) aggregates "fracturing" or separating from the refractory brick aggregate, and leaving predominantly the alumina ($Al_2O_3$) aggregate.

The contaminants or "fractured" material are relatively fine particles. Due to the nature of the centrifugal force created and the positive and negative air pressure effect created by the spinning wheel 803, the contaminants, which can include fugitive dust, and alumina ($Al_2O_3$) aggregate fall to the compartment 606 after hitting the inner lining of material 706.

Figure 13:
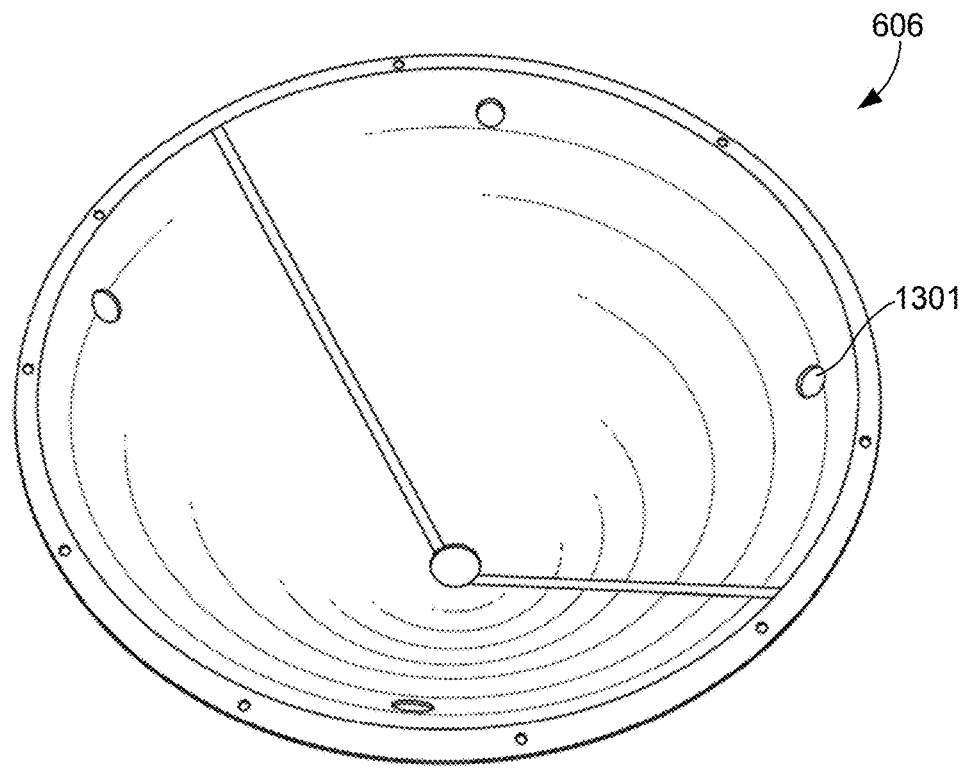
FIGS. 13 and 14 show an inner portion of an example compartment of the refining machine shown in FIG. 6 according to various embodiments of the present disclosure.
Figure 14:
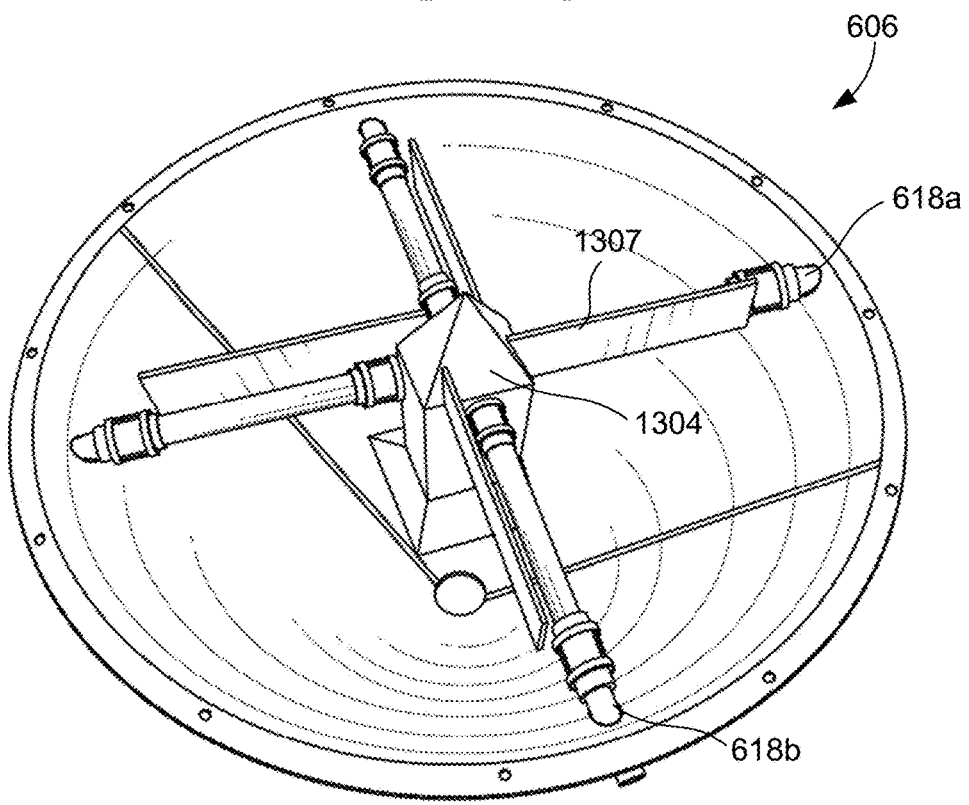

FIGS. 13 and 14 show a high angle view of the compartment 606 disassembled from the refiner machine 600. In an example embodiment, the compartment 606 may be a cone shape to facilitate the transfer of the contaminants and desired refractory aggregate material to a lower portion of the compartment 606. The compartment 606 includes one or more holes 1301 that can be used to route the dust collection valves 618a and 618b. The compartment 606 further includes a dust collection chamber 1304 and one or more anti-vortex blades 1307. The anti-vortex blades 1307 and the dust collection chamber 1304 operate to counteract a vortex effect created by the wheel 803 spinning at high speeds.

Figure 15:
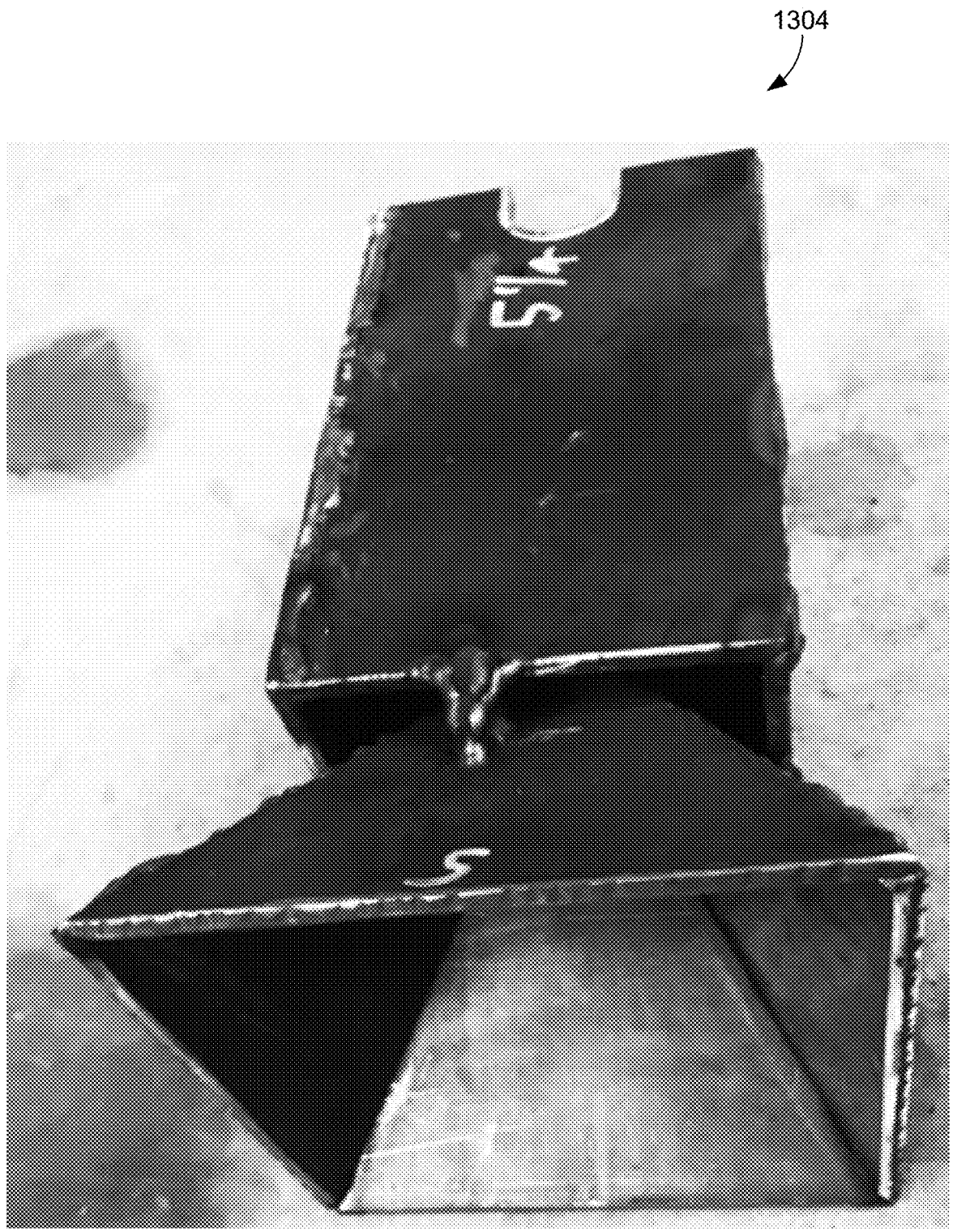
FIG. 15 shows a lateral view of a dust collecting chamber shown in FIG. 14 according to one embodiment of the present disclosure.

For example, the wheel 803 spinning at high speeds without the dust collection chamber 1304 and the anti-vortex blades 1307 can cause the desired refractory aggregate to get picked up by the dust collection valves 618a and 618b. However, with the implementation of the dust collection chamber 1304 and anti-vortex blades, which has an opening at an end portion of the body of the dust collection chamber 1304 that is opposite the end connected to the dust collection valves 618a and 618b (FIG. 15), dust collection system 1603 can be configured to extract primarily fine contaminant dust particles that become fractured from the desired refractory aggregate material. This can be due to the opening of the dust collection chamber 1304 being positioned at a lower portion of the compartment than the dust collection valves 618a and 618b. This can be further contributed to the anti-vortex plates 1307 allowing the contaminant and desired aggregate particles to fall to the lower portion of the compartment 606. For example, the dust collection chamber 1304 creates a low velocity air chamber for the pressurized air to flow through, which causes the finer contaminant particles to get picked up while the heavier desired refractory material drops to a lower portion of the compartment 606.

In other embodiments, in lieu of the anti-vortex blades 1307, an air curtain mechanism may be implemented within the refiner machine 600. For example, air curtains, also known as an air door, is a machine that blows a controlled stream of air across an opening to the other side to create an air seal. The seal separates different environments while allowing a smooth, uninterrupted flow of air traffic. Air curtains that may be used include air curtain velocities that can range from 1500-300 feet per minute (fpm).

Figure 16:
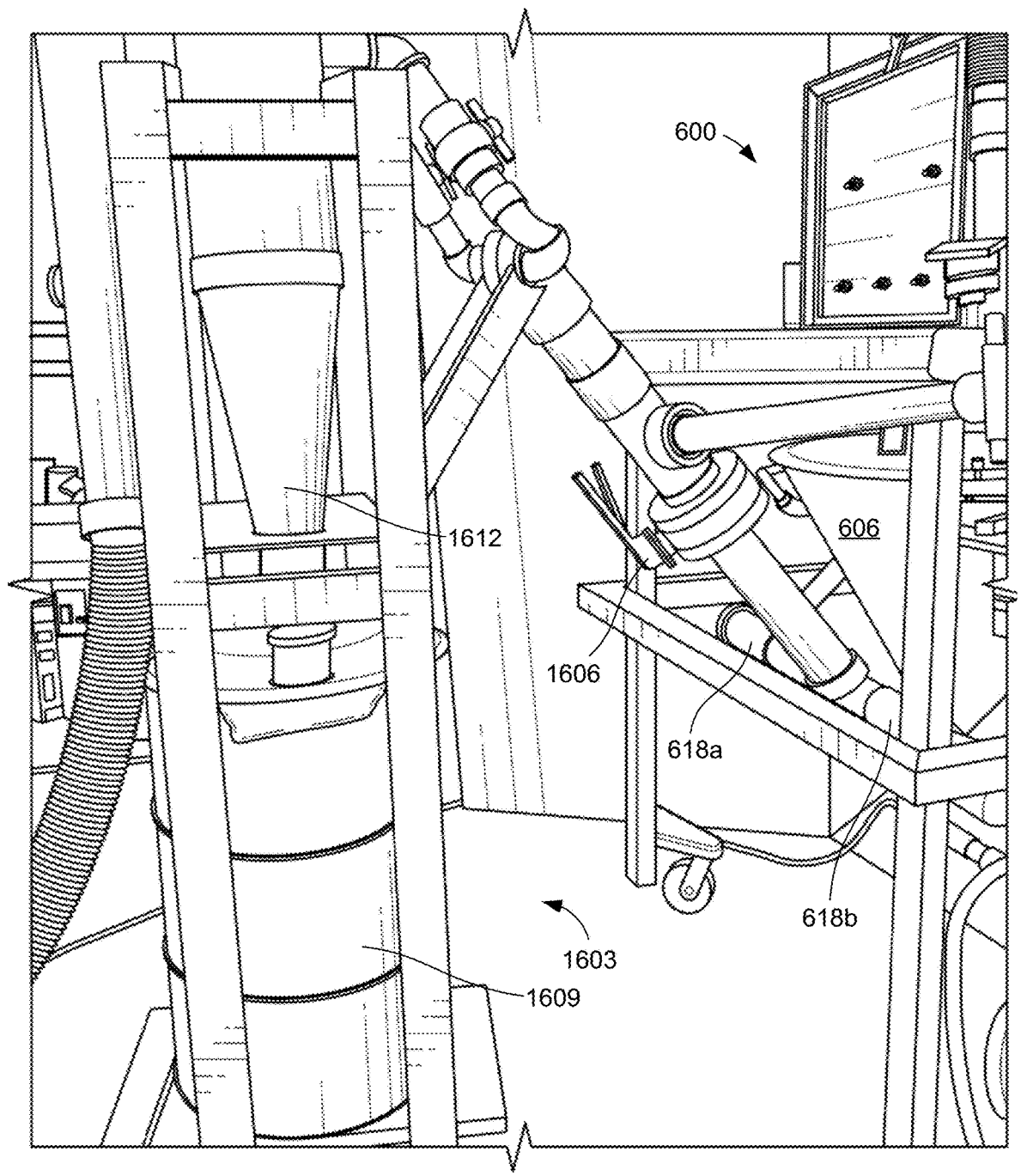
FIG. 16 shows a lateral view of the refining machine shown in FIG. 6 along with an example dust collection system connected to the refining machine according to one embodiment of the present disclosure.
Figure 17:
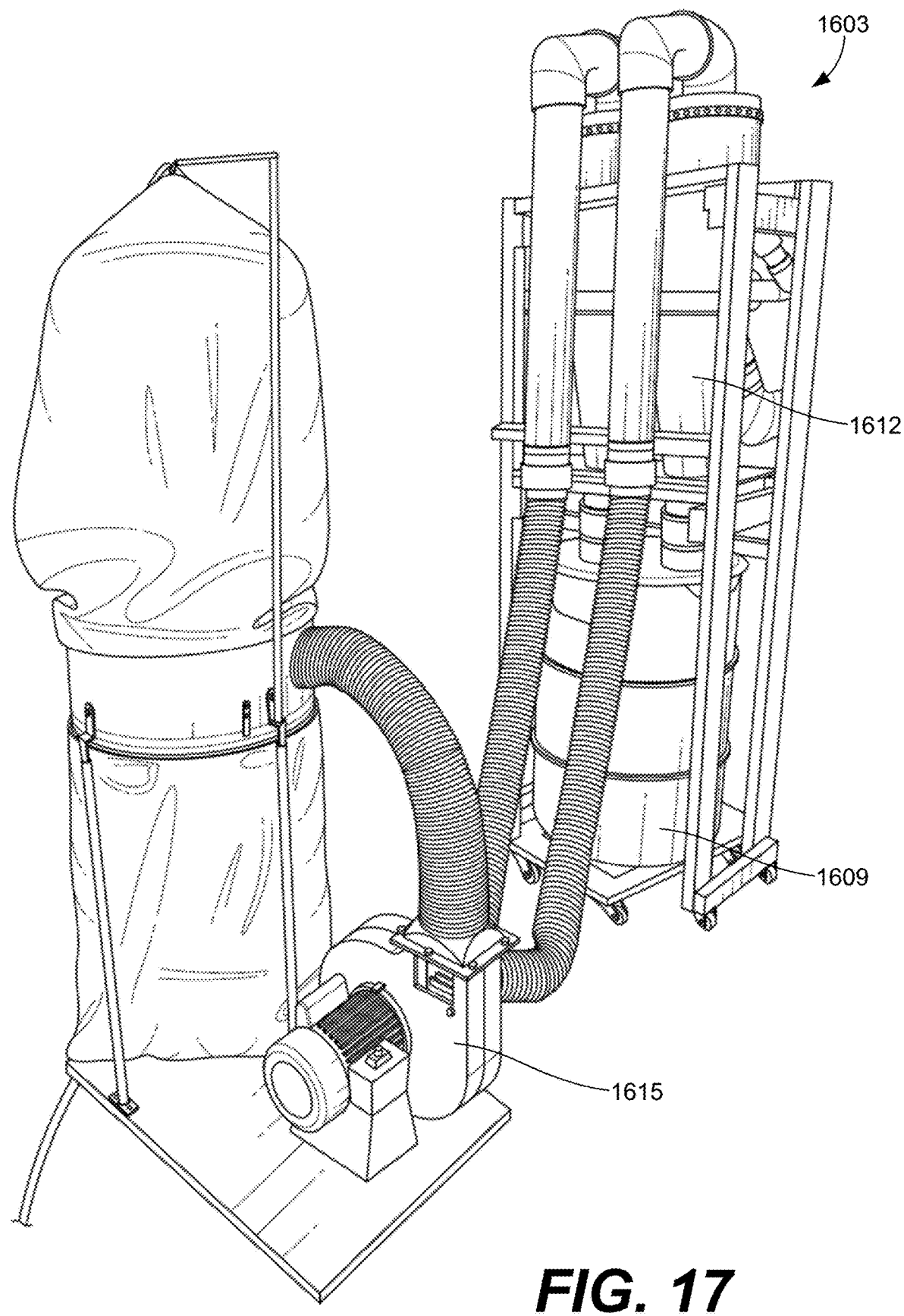
FIG. 17 shows a rear view of the dust collection system shown in FIG. 16 according to one embodiment of the present disclosure.
Figure 20:
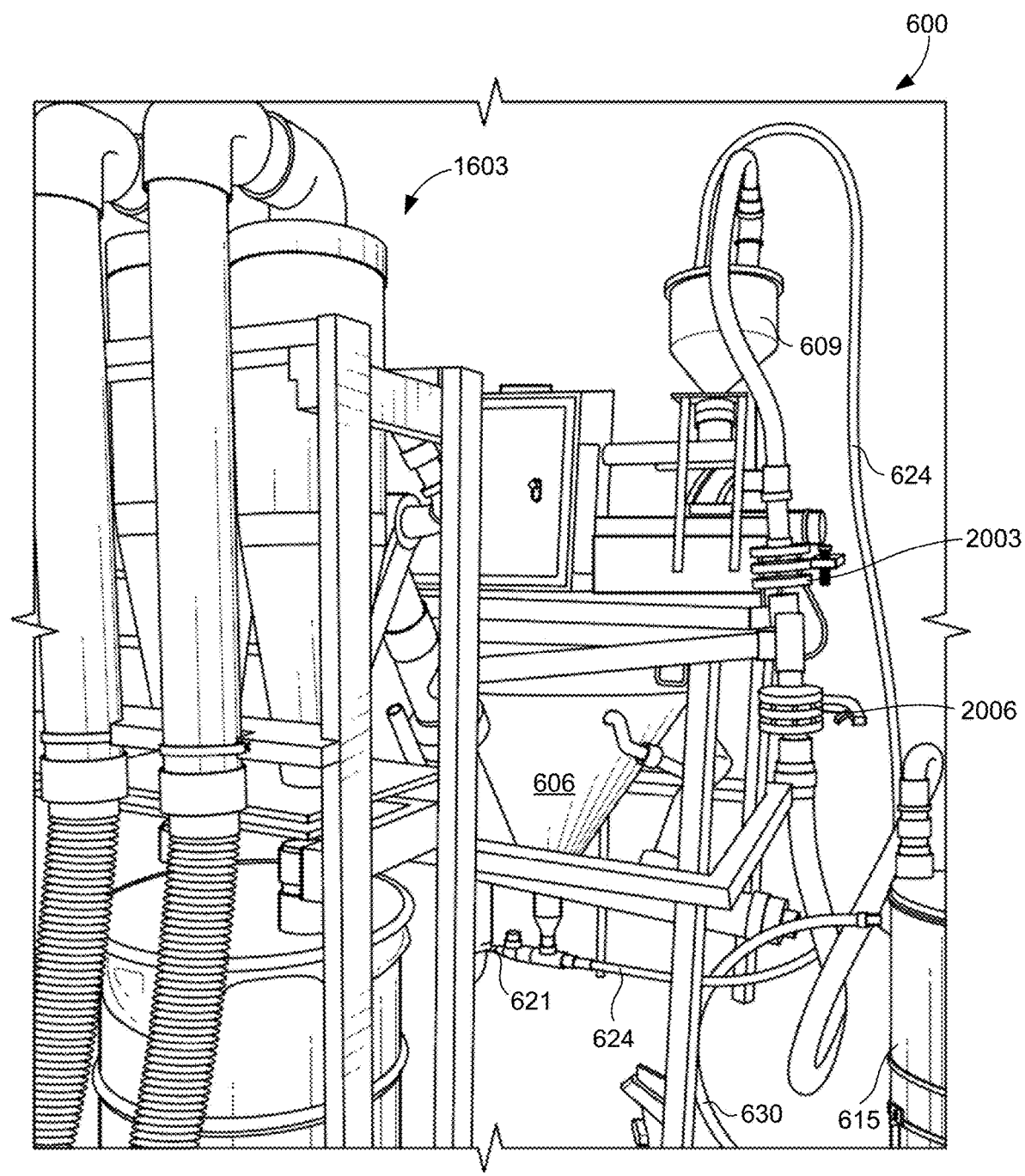
FIG. 20 shows a rear view of the refining machine shown in FIG. 6 according to one embodiment of the present disclosure.

FIGS. 16 and 17 show an example dust collection system 1603 that is connected the compartment 606 through the dust collection valves 618a and 618b. The dust collection system 1603 includes a drum 1609 where extracted contaminants become deposited. The dust collection system 1603 also includes one or more cyclones 1612, which can remove particulate from an air, gas, or liquid without the use of filters through vortex separation. Cyclone efficiency is related to its geometry, which can have cylindrical or conical shapes. Air flows in a helical pattern, beginning at the top (wide end) of the cyclone and ending at the bottom (narrow) end before exiting the cyclone in a straight stream through the center of the cyclone. Although a negative to positive air pressure is created within the blast chamber 603 and the compartment 606, and pressurized air flows through the dust collection chamber 1304 and out through the dust collection valves 618a and 618b, a motor 1615 can be used in conjunction to power a vacuum to extract contaminant particles more effectively. Therefore, contaminant particles created in the blast chamber 603 can be extracted from the refining machine 600 and into the drum 1609 through use of the cyclones 1612.

In one embodiment, the dust collection system 1603 can incorporate butterfly valves 1606 for flow regulation. Similar to a ball valve, butterfly valves can be used for flow regulation where a rod passes through a disc to an actuator on the outside of the valve. Rotating the actuator turns the disc either parallel or perpendicular to the flow. In operation, the valve may be fully open or closed when the disc is rotated a quarter turn. The butterfly valve 1606 can operate to start or halt airflow for the dust collection system 1603.

Referring back to FIG. 1, at step 121, the desired aggregate material that remains after the contaminant particles have been fractured away may be filtered again with a second screen. The second screen may be smaller in size than the screen used in step 115. That is, the opening of the squares in the second screen may be smaller than the opening of the squares in the first screen as the desired aggregate material will be smaller in size compared to before it was deposited into the refiner machine 600. In some embodiments, multiple screens may be used in this step, with each of the screens having different sizes.

In an example embodiment, refractory material that remained after crushing an example brick, depositing the brick into the refiner machine, and extracting the contaminant particles were tested for refractory content. FIG. 18 shows the chemical composition of the processed material after it had been processed three times, and FIG. 19 shows the chemical composition of the processed material after it had been processed two times. FIGS. 18 and 19 show that the largest aggregate composition of the material is alumina $Al_2O_3$, indicating that contaminants were removed effectively.

At step 124, the volume or mass of contaminants accumulated in the dust collection system 1603 is assessed. For instance, the drum may be connected to an industrial weighing system such as floor scales, hanging scales, bench scales, etc. In some embodiments, the volume or mass of contaminants may be measured through use of a load cell. When a certain mass or volume of contaminants is reached, the refining machine 600 can be shut down since the target contaminant volume or mass can be estimated based on how much initial refractory material is deposited into the refining machine. If the dust collection system 1603 target is not met, desired refractory material that has accumulated at a lower portion of the compartment 606 can be transferred back to the feed hopper 609 for a second pass. In some embodiments, it may be necessary to run the processed material again for a third pass to obtain a purer refractory aggregate material.

At step 127, the refining machine 600 can be stopped, and the desired refractory material in the compartment 606 can be transported to the harvest hopper 615. For example, FIG.

20 illustrates an example embodiment of the feed valve 624 connected to the air compression valve 621. In this embodiment, the refined aggregate material that has accumulated at a lower portion of the compartment 606 may be transferred back to the feed hopper 609 through the feed valve 624 so that the refined aggregate material can be processed again for a second pass. The air compression valve 621 may include a venturi educator and air compression system to move particles in a certain direction. To move the refined aggregate material to the harvest hopper 615, the harvest valve 630 may be connected to the air compression valve 621. Accordingly, the refined aggregate material accumulated in the compartment 606 may be transported from the compartment 606 to the harvest hopper 615. Butterfly valves 2003 and 2006, which are connected to the feed hopper 609 and the harvest hopper 615, respectively, can also be utilized to establish airflow back to the dust collection system 1603.

Other than the compressed air system approach to move refined aggregate material as discussed in step 127, other approaches may be implemented in some embodiments. For example, a conveyor belt system may be used to move the refined aggregate material. Different types of conveyor belt systems that can be used include beam trolley systems, belt conveyors, chain conveyors, inverted conveyors, live or motorized roller conveyors, overhead conveyors, over-under conveyors, slat conveyors, and other types of conveyors.

Although the flowchart of FIG. 1 shows a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for refractory recycling, comprising:
   cleaning a network of refractory aggregates to remove residual foreign particles;
   determining a maximum aggregate size of an individual refractory component of the network of refractory aggregates to be extracted, the maximum aggregate size being based on a mechanical property of the individual refractory component among the network of refractory aggregates;
   crushing the network of refractory aggregates so that individual particles of the crushed network of refractory aggregates are sized greater than the maximum aggregate size;
   filtering the crushed network of refractory aggregates by size to produce retained particles that are equal to or greater than the maximum aggregate size; and
   depositing the retained particles into a refiner machine, the refiner machine comprising a blast chamber and a contaminant collection system,
   wherein the blast chamber comprises a projecting mechanism and an enclosed outer wall, the projecting mechanism configured to spin at a set rotational speed that causes the retained particles to be propelled at a directed velocity at a stationary lining of material surrounding the enclosed outer wall, the directed velocity being determined based on a mechanical property of contaminants of the retained particles, the propulsion of the retained particles at the stationary lining of material producing refined particles comprising the individual refractory component, the refined particles being separated from the contaminants.

2. The method of claim 1, further comprising, before filtering the crushed network of refractory aggregates with a screen, exposing the crushed network of refractory aggregates to a metal detector and a magnetic separator to remove metal from the crushed network of refractory aggregates.

3. The method of claim 1, further comprising filtering the refined particles with a screen comprising a mesh size less than the maximum aggregate size, thereby producing a second set of retained particles of the refined particles that are retained on the screen.

4. The method of claim 3, further comprising transporting the retained particles of the refined particles to a second refiner machine, the second refiner machine comprising a second blast chamber and a second contaminant collection system.

5. The method of claim 1, wherein the contaminant collection system is connected to one or more valves adjacent to the blast chamber, the contaminant collection system being configured to extract the contaminants based at least in part on a compressed air system.

6. The method of claim 5, further comprising:
   measuring the extracted contaminants that have accumulated in the contaminant collection system; and
   reducing a rotational velocity of the projecting mechanism once the extracted contaminants that have accumulated in the contaminant collection system have reached a target weight or volume.

7. The method of claim 1, wherein the refined particles are transported to a harvest storage through one or more valves using a compressed air system.

8. The method of claim 7, further comprising, before the refined particles are transported to the harvest storage, activating the contaminant collection system for a target duration; and deactivating the contaminant collection system once the target duration is reached.

9. The method of claim 1, wherein the network of refractory aggregates comprises alumina ($Al_2O_3$), magnesia (MgO), silica ($SiO_2$), and phosphorous pentoxide ($P_2O_5$), and the individual refractory component comprises alumina ($Al_2O_3$).

10. The method of claim 1, wherein the projecting mechanism comprises a circular wheel with one or more blades.

11. The method of claim 1, wherein the maximum aggregate size corresponds to a range of about $\frac{3}{8}$ inch$^2$ to $\frac{1}{2}$ inch$^2$.

12. The method of claim 1, wherein the stationary lining of material comprises iron or refractory brick.

13. The method of claim 1, wherein depositing the retained particles into the refiner machine further comprises transferring, by a feed hopper connected to a feed control system, the retained particles deposited into the feed hopper into the blast chamber.

14. The method of claim 1, wherein the blast chamber is coupled to a compartment, the compartment comprising one or more holes so that one or more valves are configured to pass through the one or more holes, the one or more valves being a component of the contaminant collection system.

15. The method of claim 14, wherein the compartment comprises a contaminant collection chamber, the contaminant collection chamber is connected to the one or more valves, an opening of the contaminant collection chamber is located at a lower portion of the compartment than the one or more valves.

16. The method of claim 14, wherein the compartment comprises anti-vortex plates coupled to the one or more valves, the anti-vortex plates configured to counteract a vortex effect created by the projecting mechanism when operating at a set rotational speed.

17. The method of claim 1, further comprising estimating the critical velocity based at least in part on particle size and one or more mechanical properties of the retained particles.

18. The method of claim 1, further comprising:

assessing a mass or volume of contaminants accumulated in the contaminant collection system; and in response to determining that the mass is greater than a target mass, processing the refined particles again by the refiner machine.

19. The method of claim 1, further comprising:

assessing a mass or volume of contaminants accumulated in the contaminant collection system; and in response to determining that the mass is less than or equal to a target mass, avoiding processing the refined particles again by the refiner machine.

20. The method of claim 1, wherein:

the mechanical property of the individual refractory component comprises a hardness profile of the individual refractory component or a density profile of the individual refractory component among the network of refractory aggregates;

the mechanical property of the contaminants comprises a density profile of the contaminants within the retained particles or a hardness profile of each of the contaminants; and the directed velocity is less than a critical velocity of the individual refractory component, the critical velocity being determined based on a fracture profile of the individual refractory component, the fracture profile being determined based on the mechanical property of the individual refractory component.

* * * * *